United States Patent Office 3,257,386
Patented June 21, 1966

3,257,386
PROCESS FOR PRODUCING 16-METHYL-9α-FLU-ORO-PREDNISOLONE-21-ACETATE FROM HECOGENIN AND INTERMEDIATES THEREIN
Carl Djerassi and Albert Bowers, Mexico City, Mexico, assignors, by mesne assignments, to Syntex Corporation, a corporation of Panama
No Drawing. Filed Feb. 24, 1960, Ser. No. 10,551
Claims priority, application Mexico, Mar. 11, 1959, 53,926
13 Claims. (Cl. 260—239.55)

The present invention relates to new process for preparing certain cyclopentanophenanthrene derivatives, and more specifically to process for converting hecogenin or a lower fatty acid ester thereof into the therapeutically valuable known 16α- and 16β-methyl-derivatives of the 21-acetate of 9α-fluoro-prednisolone.

In view of the fact that hecogenin is easily obtained from plants of the sisal type, which exist abundantly in the south of Mexico and in Central America, the process of the present invention is of great industrial importance.

The process according to the invention is illustrated in its broad phases in the following Reaction Diagram I, in which $R^1$ is selected from the group consisting of hydrogen and the acyl radical of a hydrocarbon carboxylic acid having up to 12 carbon atoms; $R^2$ is selected from the group consisting of hydrogen, hydroxy, and the acyloxy radical of a hydrocarbon carboxylic acid of up to 12 carbon atoms; $Y^1$ is selected from the group consisting of

and =O; $Y^2$ is selected from the group consisting of =O and

$Z^1$ is a linkage between C–9 and C–11 selected from the group consisting of single and double bond; $Z^2$ is a linkage between C–4 and C–5 selected from the group consisting of single bond and double bond; and $Z^3$ is a linkage between C–1 and C–2 selected from the group consisting of single and double bond, and when either $Z^2$ or $Z^3$ is a double bond, the other is also a double bond.

Hydrocarbon carboxylic acids of up to 12 carbon atoms used for the formation of esters in this application can be saturated or unsaturated, of straight or branched chain, cyclic or mixed cyclic aliphatic, unsubstituted or substituted with methoxy, halogen or other groups.

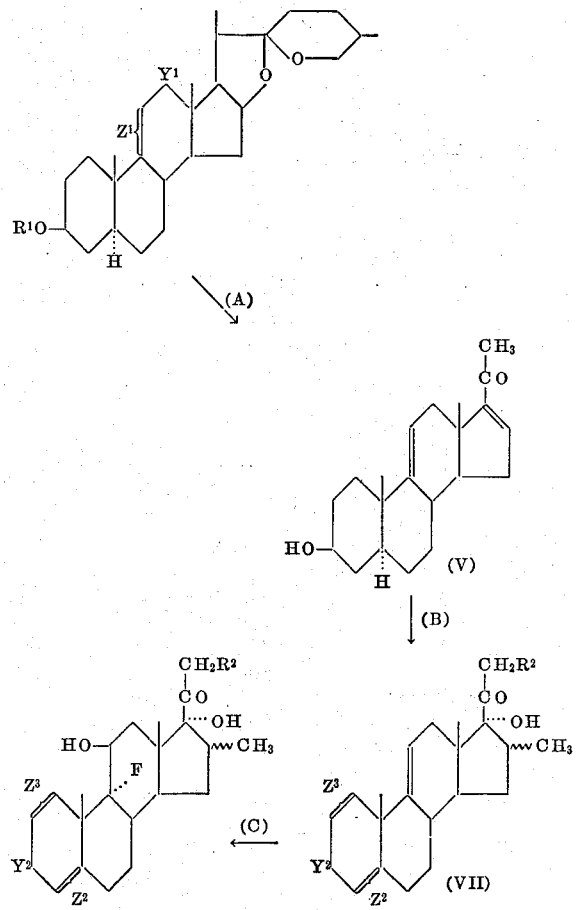

REACTION DIAGRAM I

Where the wavy line (ξ) is used in the specification and claims of this application, it represents a generic expression for the α- and β-steric configurations of substituents at C–16 of the respective steroid molecule.

The process according to the present invention thus comprises, in combination, three phases (A), (B), and (C), each of which will now be explained more in detail.

This process is distinguished from the processes hitherto known in the art by most satisfactory overall yields.

In a first mode of carrying out the process according to the invention, the above illustrated phase (A) comprises the steps illustrated in the following Reaction Diagram II, using hecogenin acetate as the starting material by way of example:

REACTION DIAGRAM II

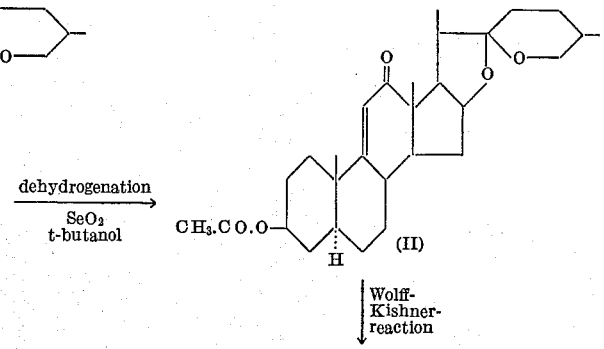

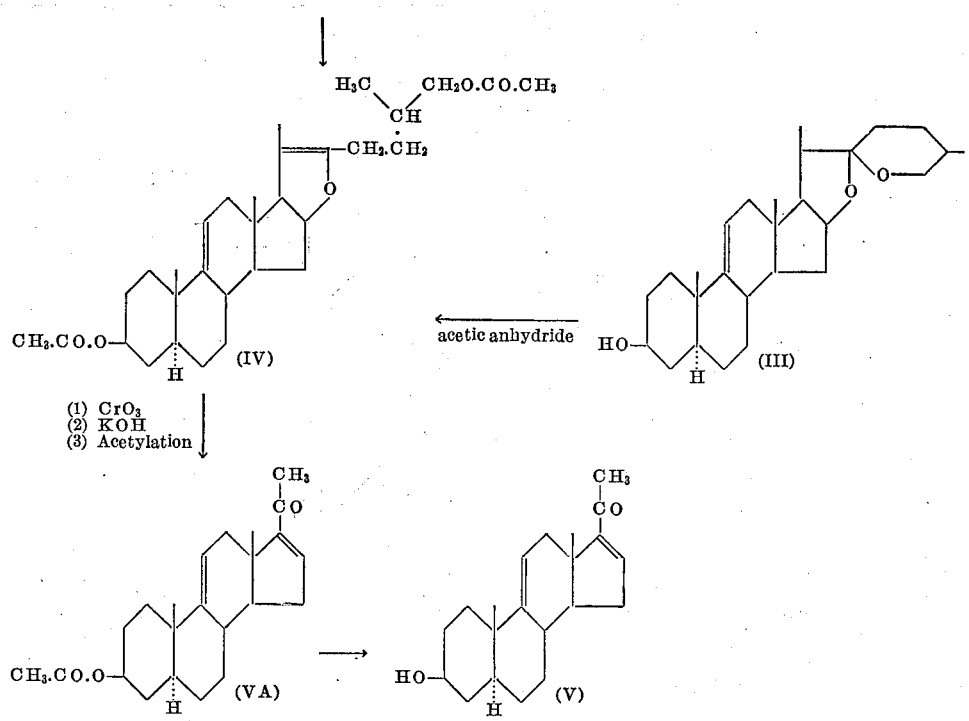

Hereinafter there are described in more detail the transformations involved in the above illustrated phase (A) of the process according to the present invention.

By refluxing an ester of hecogenin such as its acetate (I) with selenium dioxide in mixture with a tertiary aliphatic alcohol such as t-butanol or t-amyl alcohol and in the presence of pyridine there was obtained the acetate of 9(11)-dehydro-hecogenin (II), which was reduced by the Wolff-Kishner reaction to 9(11)-dehydro-tigogenin (III).

The surprising discovery was made that 9(11)-dehydro-tigogenin may be degraded to the diacetate of $\Delta^{9(11),20(22)}$-allofurostadiene-3$\beta$,26-diol (IV) by treatment with acetic anhydride at approximately 200° C. for a period of time of only 45 to 60 minutes, which modification of the usual method is of general importance for the preparation of pseudo-sapogenins. Upon subsequent oxidation with chromic acid or the complex of chromic acid and pyridine there was obtained the 3-acetate-16-($\gamma$-methyl-$\delta$-acetoxy)-valerate of $\Delta^{9(11)}$-allopregnene-3$\beta$,16$\beta$-diol-20-one, which was treated with potassium hydroxide and then acetylated to produce the acetate of $\Delta^{9(11),16}$-allopregnadien-3$\beta$-ol-20-one (VA).

The above described new method for converting hecogenin into $\Delta^{9(11),16}$-allopregnadien-3$\beta$-ol-20-one, [compound described by Djerassi et al. (J. Org. Chem., 16, 1278 (1951)] is superior to the original method as far as the yield is concerned.

In Phase (B) of the process according to the invention as outlined in Reaction Diagram I, $\Delta^{9(11),16}$-allopregnadien-3$\beta$-ol-20-one (V) is converted to the 16$\alpha$-methyl-derivatives and 16$\beta$-methyl-derivatives of $\Delta^{9(11)}$-allopregnene-3$\beta$,17$\alpha$-diol-20-one. This phase is illustrated in Reaction Diagram III and IV below:

REACTION DIAGRAM III

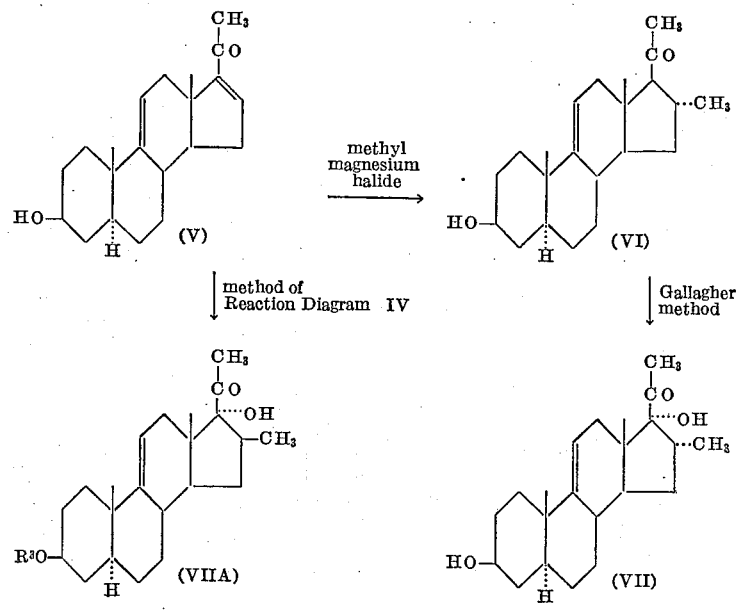

According to Reaction Diagram III, $\Delta^{9(11),16}$-allopregnadien-3β-ol-20-one (V) was first refluxed with a methyl magnesium halide such as methyl magnesium bromide or iodide in benzene solution and the 17α-hydroxyl group was then introduced into the resulting 16α-methyl-$\Delta^{9(11)}$-allopregnen-3β-ol-20-one (VI) by the method of Gallagher (J. Am. Chem. Soc., 74, 483 (1952)) to obtain 16α-methyl-$\Delta^{9(11)}$-allo-pregnene-3β,17α-diol-20-one (VII).

The corresponding 16β-methyl derivative is obtained in accordance with Reaction Diagram IV below, in which $R^3$ is either hydrogen or acetyl:

REACTION DIAGRAM IV

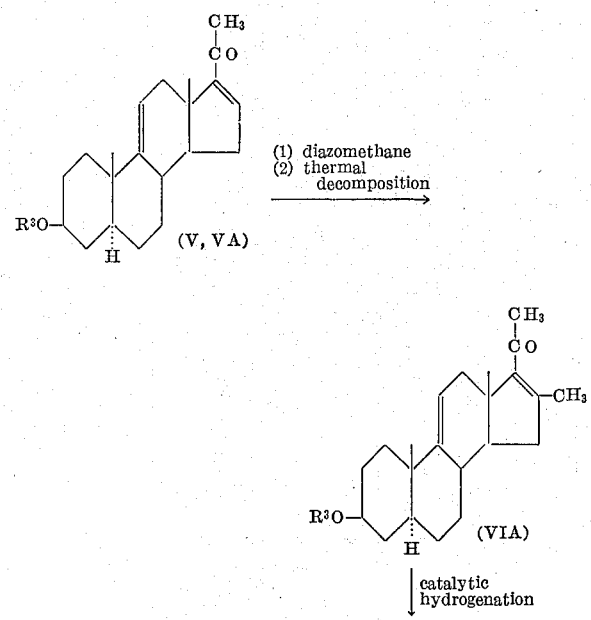

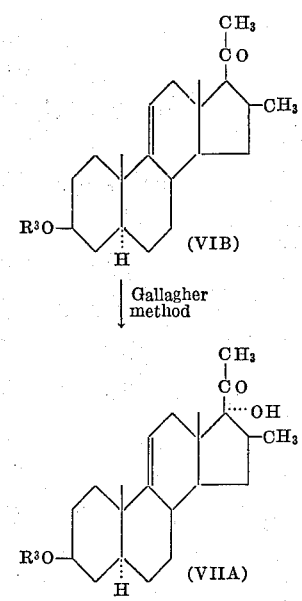

$\Delta^{9(11),16}$-allopregnadien-3β-ol-20-one (V) or preferably its acetate (VA) was converted by the addition of diazomethane to the C-16, 17 double bond to the respective pyrazoline which was then thermically decomposed by the treatment described by Wettstein et al. in Helv. Chim. Acta, XXVII, 1803 (1944), to obtain 16-methyl-$\Delta^{9(11),16}$-allopregnadien-3β-ol-20-one or its acetate (VIA).

By catalytic hydrogenation of either compound (VIA), for example with palladium on carbon in methanol, there was obtained the acetate of 16β-methyl-$\Delta^{9(11)}$-allopregnen-3β-ol-20-one, or the free compound (VIB), which was hydroxylated at C-17α by the method of Gallagher (loc. cit.), thus producing 16β-methyl-$\Delta^{9(11)}$-allopregnene-3β,17α-diol-20-one (VIIA).

In another mode of carrying out Phase B of the process according to the invention, 16α-methyl-$\Delta^{9(11)}$-allopregnene-3β,17α-diol-20-one was obtained as shown in Reaction Diagram V below, but with much higher yields which permit to raise the overall yields of the entire process very considerably.

REACTION DIAGRAM V

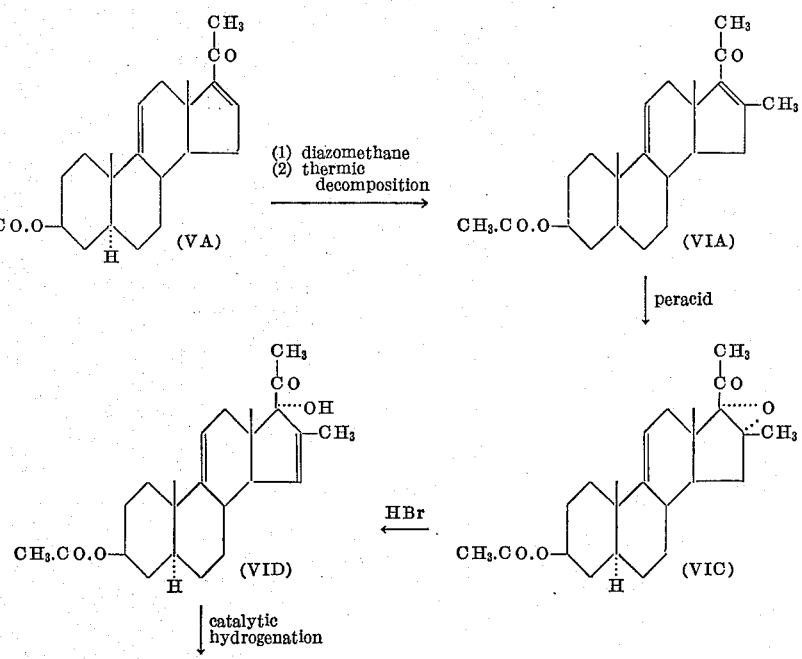

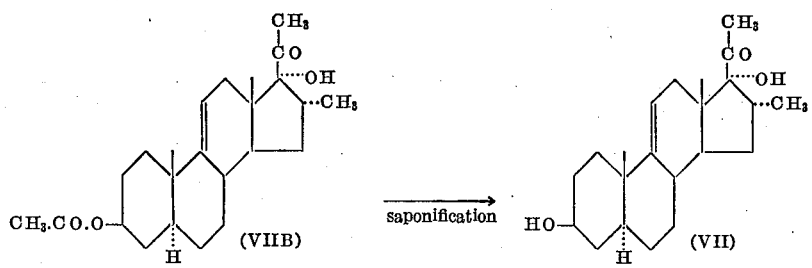

In the same manner as described in connection with Reaction Diagram IV above, namely by addition of diazomethane to the C–16, 17 double bond of Δ⁹⁽¹¹⁾,¹⁶-allopregnadien-3β-ol-20-one, preferably in the form of its acetate (VA), there was again produced the respective pyrazoline which upon thermal decomposition was converted to the aforesaid 16-methyl-Δ⁹⁽¹¹⁾,¹⁶-allopregnadien-3β-ol-20-one or its acetate (VIA), respectively; however, the double bond at C–16, 17 of (VIA) was then selectively epoxidized preferably in the acetate of the above compound and thus there was obtained the acetate of 16β-methyl-16α,17α-oxido-Δ⁹⁽¹¹⁾-allopregnen-3β-ol-20-one (VIC).

While the reaction of steroidal 16α,17α-epoxides with hydrogen bromide generally gives rise to the formation of bromohydrins, the reaction of a steroidal 16β-methyl-16α,17α-oxido compound with hydrobromic acid in acetone leads to the formation of an unsaturated 16-methyl-Δ¹⁵-compound (VID), which reaction proceeds probably through spontaneous dehydrobromination of an intermediate 16-methyl-16-bromo-compound. By hydrogenation of the unsaturated compound there is obtained the 16α-methyl-17α-hydroxy compound saturated in ring D.

By applying this method, the acetate of 16β-methyl-16α,17α-oxido-Δ⁹⁽¹¹⁾-allopregnen-3β-ol-20-one (VIC) was converted via the above-mentioned 16-methyl-Δ¹⁵-intermediate (VID) to the acetate of 16α-methyl-Δ⁹⁽¹¹⁾-allopregnene-3β,17α-diol-20-one (VIIB), the acetoxy group of which was hydrolyzed by alkaline treatment to obtain the free compound (VII).

In phase (C) of the process according to the invention as outlined in Reaction Diagram I, the abovementioned 16α-methyl derivative (VII) or its 16β-epimer (VIIA) were converted into the 21-acetates of the corresponding 16α- or 16β-derivative of 9α-fluoro-prednisolone. This phase is illustrated in Reaction Diagram VI below, while it should be borne in mind that for the final result of the process of the present invention the order in which the subsequent operations are carried out, is only of secondary importance:

REACTION DIAGRAM VI

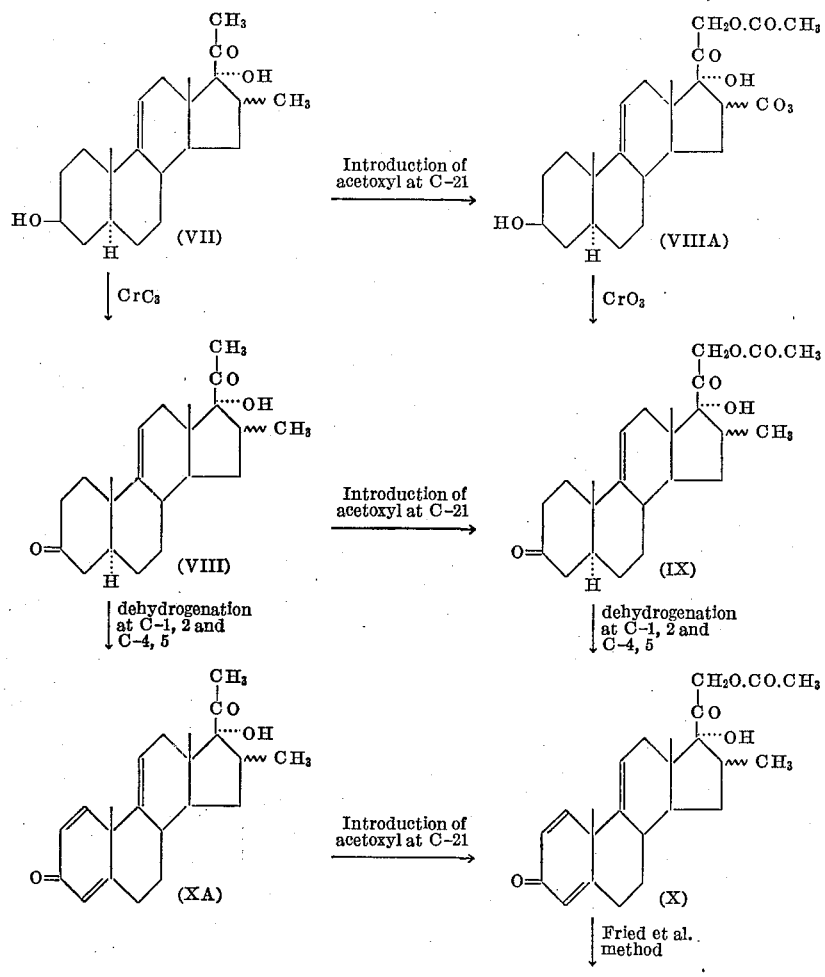

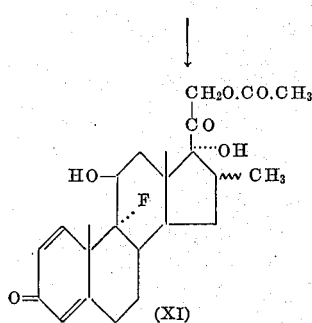
(XI)

The above-illustrated phase (C) thus involves the oxidation of the 3β-hydroxyl group to the keto group, the acetoxylation at C-21, the formation of the 9α-fluoro-11β-hydroxy grouping and, as a last step, the introduction of double bonds at C-1, 2 and C-4, 5.

First the free 16α-methyl or 16β-methyl derivatives of $\Delta^{9(11)}$-allopregnene-3β,17α-diol-20-one (VII, VIIA) which were obtained from their acetates by conventional saponification were oxidized with 8 N chromic acid and there were obtained the 16α- or 16β-methyl derivatives of $\Delta^{9(11)}$-allopregnen-17α-ol-3,20-dione (VIII).

An acetoxy group was introduced at C-21 into the latter compound preferably by the method of Ringold and Stork, described in Patent 2,874,154 comprising the monoiodination at C-21 by reaction with iodine and calcium oxide in tetrahydrofurane-methanol, followed by acetolysis by refluxing with potassium acetate in acetone, or by monobromination at the C-21 position, interchange of the bromine by iodine and subsequent acetolysis by refluxing with potassium acetate in acetone; either method afforded the 16α- or 16β-isomers of 16-methyl-21-acetoxy-$\Delta^{9(11)}$-allopregnen-17α-ol-3,20-dione (IX). These compounds were dibrominated at C-2 and C-4 by reaction with two molar equivalents of bromine in solution in chloroform saturated with dry hydrogen chloride and containing 1% of ethanol, and the resulting compounds were then dehydrobrominated by heating with calcium carbonate in mixture with dimethylformamide, to produce the 16α- or 16β-isomers of 16-methyl-21-acetoxy-$\Delta^{1,4,9(11)}$-pregnatrien-17α-ol-3,20-dione (X). The method of Fried et al. for the halogenation at C-9α of 9(11)-dehydro-steroids, described for example in J. Am. Chem. Soc., 79, 1130 (1957), was then applied to compounds (X), and there were obtained the 21-acetates of 16α-methyl-9α-fluoro-prednisolone and of its 16β-isomer (XI).

Alternatively, 16-methyl-$\Delta^{9(11)}$-allopregnene-3β,17α-diol-20-one was first acetoxylated at C-21 (VIIIA) and then oxidized to the corresponding 16-methyl-21-acetoxy-$\Delta^{9(11)}$-allopregnen-17α-ol-3,20-dione (IX) by the aforementioned procedure.

In another variation of phase (C), the double bonds at C-1, 2 and C-4, 5 of the 16α- and 16β-methyl derivatives of $\Delta^{9(11)}$-allopregnen-17α-ol-3,20-dione (VIII) were introduced by the above-described methods of bromination and subsequent dehydrobromination, and there were obtained the corresponding derivatives of $\Delta^{1,4,9(11)}$-pregnatrien-17α-ol-3,20-dione (XA), which were acetoxylated at C-21 to give the aforementioned 16α- or 16β-methyl derivatives of 21-acetoxy-$\Delta^{1,4,9(11)}$-pregnatrien-17α-ol-3,20-dione (XI).

According to another mode of carrying out phase C in practice, the method of Fried et al. supra is applied directly to the 16α and 16β isomers of 16-methyl-$\Delta^{9(11)}$-allopregnen-17α-ol-3,20-dione (VIII) as illustrated in Reaction Diagram VII below:

REACTION DIAGRAM VII

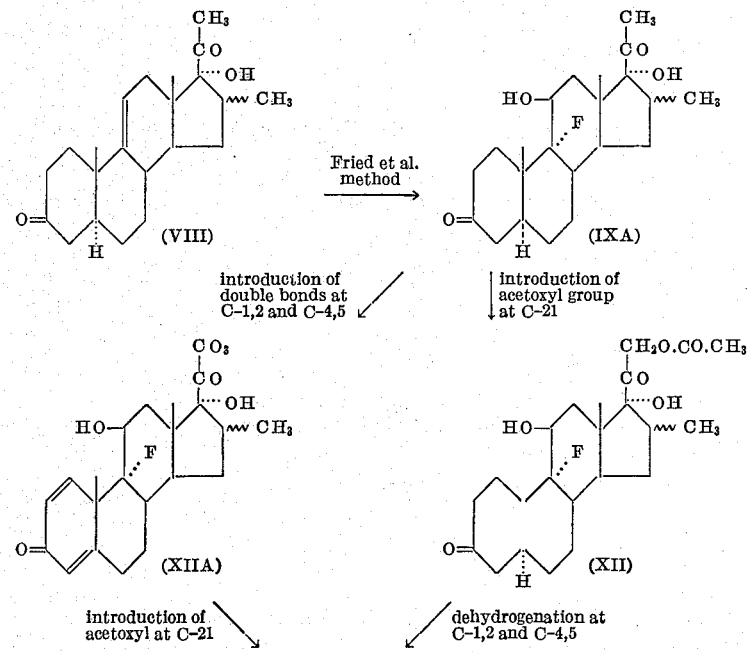

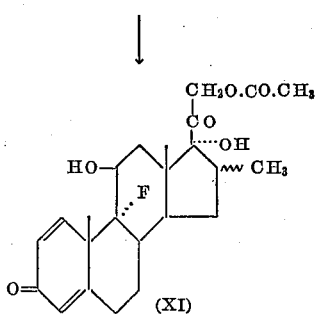

By the above-mentioned treatment according to Fried et al. supra, there were thus obtained the isomers of 16-methyl-9α-fluoro-allopregnane-11β,17α-diol - 3,20 - dione (IXA), which were acetoxylated to the stereoisomers of 16-methyl-9α-fluoro-21-acetoxy - allopregnane - 11β,17α-diol-3,20-dione (XII), and then, by introducing the double bonds at C–1, 2 and C–4, 5, there were obtained the corresponding isomers of the 21-acetate of 16α- or 16β-methyl-9α-fluoro-prednisolone (XI).

Alternatively, the introduction of double bonds at C–1, 2 and C–4, 5 into the 16α- and 16β-isomers of the 16-methyl-9α-fluoro-allopregnane - 11β,17α - diol-3,20-dione (IXA) afforded the isomers of 16-methyl-9α-fluoro-Δ¹,⁴-pregnadiene-11β,17α-diol-3,20-dione (XIIA), which were acetoxylated to those of the 21-acetate of 16-methyl-9α-fluoro-prednisolone (XI).

The 9α-halogenation by reaction with N-bromo-acetamide and perchloric acid, in accordance with Fried, may be effected by using any other reagent capable of generating hypochlorous acid, such as another N-bromo-amide, an N-bromo-imide or the hypochlorite of an alkali or alkali-earth metal; when opening the 9β,11β-oxido ring of the epoxide compound intermediate in this halogenation with hydrochloric acid, there are obtained the respective intermediates and final compounds having a chlorine atom at C–9α instead of fluorine; the double bonds at C–1, 2 and C–4, 5 may be introduced by biological methods such as by incubation with *Septomyxa affinis* ATCC 6737 or by refluxing with selenium dioxide, for example in mixture with tertiary amyl alcohol and in the presence of catalytic amounts of pyridine.

The intermediates of the formulas

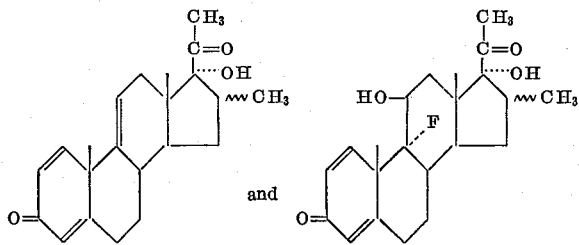

produced in the above-described process according to the invention are at the same time hormones of corticoid activity which show especially anti-inflammatory activity.

The invention is further illustrated but not limited by the following examples:

EXAMPLE 1

A mixture of 20 g. of hecogenin acetate, 10 g. of recently sublimed selenium dioxide, 500 cc. of t-butanol and a few drops of pyridine was refluxed under an atmosphere of nitrogen for 96 hours, filtered through celite and evaporated to dryness under reduced pressure. The residue was decolorized by refluxing in acetone solution with decolorizing charcoal and after evaporating the filtered acetone solution the crude product was purified by chromatography on neutral alumina, thus giving the 3-acetate of Δ⁹⁽¹¹⁾-22-iso-allospirosten-3β-ol-12-one, namely the acetate of Δ⁹⁽¹¹⁾-dehydro-hecogenin.

A mixture of 15.5 g. of the above compound, 300 cc. of ethyleneglycol and 9 cc. of hydrazine hydrate was refluxed for 1 hour, cooled, treated with 30 g. of potassium hydroxide in 30 cc. of water, heated in the open flask until the temperature reached 195° C., and the mixture was then refluxed for 4 hours. After cooling, the mixture was diluted with water, acidified with hydrochloric acid, extracted with chloroform and the extract was washed with water and the solvent was evaporated. By chromatography of the residue on neutral alumina followed by crystallization of the solid fractions from methanol-chloroform there was obtained Δ⁹⁽¹¹⁾-22-iso-allospirostan-3β-ol.

A mixture of 10 g. of the above compound and 50 cc. of acetic anhydride was heated in a sealed tube at 200° C. for 45 minutes; the cooled mixture was poured into water, the excess of anhydride was allowed to hydrolyze and the product was extracted with ethyl acetate, washed with 5% aqueous sodium bicarbonate solution and water, dried over anhydrous sodium sulfate and evaporated to dryness, thus giving an oily residue consisting of the crude diacetate of Δ⁹⁽¹¹⁾,²⁰⁽²²⁾-allofurostadiene-3β,26-diol.

The above oil was dissolved in 160 cc. of acetic acid and 30 cc. of water and treated at 15° C. under stirring with a solution of 6 g. of chromium trioxide in a mixture of 80 cc. of acetic acid and 8 cc. of water. The mixture was kept for 2 hours at room temperature and then diluted with water and extracted with chloroform; the extract was washed with aqueous sodium bicarbonate solution and water, dried over anhydrous sodium sulfate and evaporated to dryness thus giving the 3-acetate-16-γ-methyl-δ-acetoxyvalerate of Δ⁹⁽¹¹⁾-allopregnene-3β,16β-diol-20-one in crude form.

The above compound was mixed with 60 cc. of acetone, 30 cc. of water and 5 g. of potassium hydroxide and refluxed for 1 hour, cooled, diluted with water and extracted with ether; the extract was washed with water, dried over anhydrous sodium sulfate and the solvent was evaporated. Upon subsequent treatment with 5 cc. of acetic anhydride and 50 cc. of pyridine for 1 hour on the steam bath, precipitation of the product with water and purification by recrystallization from methanol, there was obtained the acetate of Δ⁹⁽¹¹⁾,¹⁶-allopregnadien-3β-ol-20-one.

A mixture of 8.7 g. of the above compound, 250 cc. of dry benzene free of thiophene and 60 cc. of a 3 N solution of methyl magnesium bromide was refluxed for 6 hours; the mixture was then poured into 1 liter of water containing 100 g. of ammonium chloride and 1 kg. of crushed ice, under vigorous stirring, and the benzene layer was separated, washed with dilute hydrochloric acid and with water to neutral, dried over anhydrous sodium sulfate and the solvent was evaporated. By chromatography of the residue on neutral alumina there was obtained 16α-methyl-Δ$^{9(11)}$-allopregnen-3β-ol-20-one; M.P. 194–195° C.; [α]$_D$ +63° (chloroform).

A solution of 7 g. of the above compound in 250 cc. of acetic anhydride containing 1.8 g. of p-toluenesulfonic acid monohydrate was subjected to a slow distillation in such a manner that in the course of 5 hours the volume was reduced to about 100 cc.; the cooled mixture was diluted with water, extracted with ether and the extract was washed with 5% aqueous sodium hydroxide solution and water, dried over anhydrous sodium sulfate, the ether was evaporated and the anhydride was finally eliminated under vacuum. There was thus obtained a brown syrupy product consisting of the diacetate of the crude 16α-methyl-Δ$^{9(11),17(20)}$-allopregnadiene-3β,20-diol.

The above crude compound was dissolved in 100 cc. of chloroform, cooled to 0° C. and treated with an ether solution of monoperphthalic acid containing 1.1 molar equivalents of the peracid; the mixture was kept overnight at 0° C. and then for 24 hours at room temperature. After dilution of the mixture with water, the organic layer was separated, washed with water, dried over anhydrous sodium sulfate and evaporated to dryness, thus affording the crude diacetate of 16α-methyl-17,20-oxido-Δ$^{9(11)}$-allopregnene-3β,20-diol.

The above crude compound was treated with 1 liter of a 0.25 N solution of sodium hydroxide in 50% ethanol, kept at room temperature for 40 minutes, acidified with acetic acid, and evaporated under reduced pressure; the residue was purified by chromatography on neutral alumina, thus yielding 16α-methyl-Δ$^{9(11)}$-allopregnene-3β,17α-diol-20-one.

A solution of 5 g. of the above compound in 500 cc. of acetone was cooled to 0° C., flushed with nitrogen and slowly treated under stirring with an 8 N solution of chromic acid prepared in dilute sulfuric acid, until the brown-red color of chromium trioxide persisted in the mixture. It was then kept at 0° C. for 10 minutes further, then diluted with ice water and the precipitate was collected by filtration, washed with water, dried and recrystallized from acetone-hexane, thus furnishing 16α-methyl-Δ$^{9(11)}$-allopregnen-17α-ol-3,20-dione.

A cooled solution of 4 g. of the above compound in 30 cc. of tetrahydrofurane and 18 cc. of methanol was treated under vigorous stirring with 6 g. of calcium oxide and then with 6 g. of iodine. The mixture was stirred at room temperature until the color of the solution turned pale yellow, then poured into ice water containing 16 cc. of acetic acid and 2 g. of sodium thiosulfate and stirred for 15 minutes; most of the liquid was decanted and the precipitate was collected by filtration, washed with water and dried under vacuum. There was thus obtained the crude 16α-methyl-21-iodo-Δ$^{9(11)}$-allopregnen-17α-ol-3,20-dione.

The above substance was mixed with 100 cc. of anhydrous acetone and 12 g. of recently fused potassium acetate and refluxed for 20 hours. The mixture was concentrated to a small volume under reduced pressure, diluted with water and the reaction product was extracted with ether; the extract was washed with water, dried over anhydrous sodium sulfate and the ether was evaporated. Recrystallization of the residue from acetone-hexane afforded the 21-acetate of 16α-methyl-Δ$^{9(11)}$-allopregnene-17α,21-diol-3,20-dione.

A suspension of 3 g. of the above compound in 60 cc. of chloroform containing 0.6 cc. of ethanol was saturated with dry hydrogen chloride for 15 minutes under strong stirring; there was then added under stirring and in the course of 50 minutes 150 cc. of chloroform containing 2.1 molar equivalents of bromine, waiting until decolorization occurred before each addition. The mixture was stirred for 5 minutes further, diluted with 150 cc. of ether and the precipitate was collected by filtration, thus giving the 21-acetate of 2,4-dibromo-Δ$^{9(11)}$-allopregnene-17α,21-diol-3,20-dione in crude form.

The above compound was dissolved in 20 cc. of dimethylacetamide and added to a suspension of 1.5 g. of calcium carbonate in 30 cc. of dimethylacetamide previously heated to boiling; the mixture was refluxed under strong stirring for 15 minutes, cooled, poured into water and acidified with hydrochloric acid. The precipitate was collected, washed with water, dried and recrystallized from acetone-hexane, thus furnishing the 21-acetate of 16α-methyl-Δ$^{1,4,9(11)}$-pregnatriene-17α,21-diol-3,20-dione.

A mixture of 3.75 g. of the above compound, 40 cc. of pure dioxane and 6 cc. of 0.4 N perchloric acid was treated in the course of 1 hour with 2.0 g. of N-bromoacetamide, under continuous stirring. The mixture was stirred for 1 hour further, then treated with aqueous sodium bisulfite solution until the starch-potassium iodide indicator paper no longer gave a blue color; ice and 60 cc. of chloroform were added, the organic layer was separated and washed consecutively with water, saturated aqueous sodium bicarbonate solution and water, dried over anhydrous sodium sulfate and evaporated to dryness. Upon trituration of the residue with acetone there was obtained the 21-acetate of 16α-methyl-9α-bromo-prednisolone.

The above compound was dissolved in 80 c. of acetone, mixed with 3.0 g. of anhydrous potassium acetate and refluxed for 18 hours. Most of the acetone was then evaporated, the residue was cooled and diluted with 50 cc. of ice water; the precipitate was collected, washed with water and dried, thus affording the 21-acetate of 16α-methyl-9β,11β-oxido-Δ$^{1,4}$-pregnadiene-17α,21-diol-3,20-dione.

In a polyethylene flask fitted with a magnetic stirrer was dissolved 1.5 g. of the above compound in 100 cc. of methylene chloride, cooled to 0° C. and the solution was added little by little under stirring to a mixture of 2.73 g. of anhydrous hydrogen fluoride and 4.8 g. tetrahydrofurane, cooled in an acetone-Dry Ice bath, in the course of 10 minutes. The mixture was then stirred at −80° C. for 7 hours, neutralized with saturated aqueous sodium bicarbonate solution, transferred to a separatory funnel and the organic phase was separated, washed with water and concentrated under reduced pressure until upon cooling there was formed an abundant precipitate. The product, consisting of the 21-acetate of 16α-methyl-9α-fluoro-prednisolone, was collected and recrystallized from aqueous methanol.

EXAMPLE 2

A solution of 7 g. of the acetate of Δ$^{9(11),16}$-allopregnadien-3β-ol-20-one, prepared in accordance with the method described in the preceding example, in 200 cc. of an ether solution of diazomethane prepared from 50 g. of nitrosomethylurea was allowed to react at room temperature for 24 hours and then treated with 5 cc. of acetic acid; the solution was evaporated under reduced pressure in a bath at 40° C. almost to dryness and the residue was crysallized from acetone, thus yielding the 3-acetoxy-pyrazoline, which was decomposed by the thermic procedure described by Wettstein (Helv. Chim. Acta, XXVII, 1803, (1944)), by gradually heating to about 180° C. under vacuum. By recrystallization of the crude product from acetone there was obtained 16-methyl-Δ$^{9(11),16}$-allopregnadien-3β-ol-20-one acetate.

A solution of 5 g. of the above compound in 350 cc. of methanol was treated with 20 cc. of a 4 N aqueous solution of sodium hydroxide and then with 20 cc. of 30% aqueous hydrogen peroxide solution, maintaining the temperature below 15° C. The mixture was then kept overnight in the refrigerator, poured into ice water and the precipitate was collected, washed with water, dried and dissolved in 25 cc. of pyridine. The solution was treated with 5 cc. of acetic anhydride and kept overnight at room temperature, poured into water, heated for half an hours on the steam bath, cooled and the precipitate was collected, washed with water and dried, thus furnishing the crude acetate of 16β-methyl-16α,17α-oxido-Δ$^{9(11)}$-allopregnen-3β-ol-20-one.

To a solution of the above compound in 100 cc. of pure acetone was added 20 cc. of constant boiling aqueous hydrobromic acid, little by little, with stirring and maintaining the temperature around 10° C. The mixture was stirred for half an hour further at 10° C., diluted with ice water and the precipitate was collected by filtration, washed with water and dried. It was then dissolved in 400 cc. of methanol containing 500 mg. of a prereduced palladium on charcoal catalyst and hydrogenated at room temperature until the equivalent of 1 mol of hydrogen had been absorbed, which occurred in a few minutes. The catalyst was removed by filtration, the solution was evaporated to dryness and the residue purified by chromatography on neutral alumina, this yielding the 3-acetate of 16α-methyl-$\Delta^{9(11)}$-allopregnene-3β,17α-diol-20-one. By hydrolysis of the acetoxy group by common methods, such as treatment with 1% methanolic potassium hydroxide at low temperatures, there was then obtained the free 16α-methyl-$\Delta^{9(11)}$-allopregnene-3β,17α-diol-20-one, identical with the intermediate of Example 1, which was further processed as described in the latter example to obtain 16α-methyl-9α-fluoro-prednisolone 21-acetate.

EXAMPLE 3

A solution of 5 g. of the acetate of 16-methyl-$\Delta^{9(11),16}$-allopregnadien-3β-ol-20-one, prepared in accordance with the preceding example, in 50 cc. of ethyl acetate was hydrogenated in the presence of a prereduced palladium on carbon catalyst until the equivalent of 1 mol of hydrogen was absorber; the catalyst wae removed by filtration, the filtrate was evaporated to dryness and the residue crystallized from acetone-hexane, thus affording the acetate of 16β-methyl-$\Delta^{9(11)}$-allopregnen-3β-ol-20-one.

A mixture of 3 g. of the above compound, 125 cc. of acetic anhydride and 0.75 g. of p-toluenesulfonic acid monohydrate was subjected to a slow distillation in such a manner that in the course of 5 hours the volume was reduced to about 60 cc., the cooled mixture was diluted with water, extracted with ether and the extract was washed with 5% aqueous sodium hydroxide solution, dried over anhydrous sodium sulfate and evaporated to dryness, under vacuo, there was thus obtained 16β-methyl-$\Delta^{9(11)17(20)}$-allopregnadiene-3β,20-diol diacetate.

The above crude compound was dissolved in 35 cc. of chloroform, cooled to 0° C. and treated with an ether solution of monoperphthalic acid containing 1.1 molar equivalents of the peracid; the mixture was kept for 24 hours at room temperature. After diluting with water the organic layer was separated, washed with water, dried over anhydrous sodium sulfate and evaporated to dryness, thus affording the crude diacetate of 16β-methyl-17,20-oxido-$\Delta^{9(11)}$-allopregnene-3β,20-diol, that was treated without further purification, with 750 cc. of a 0.25 N solution of sodium hydroxide in 50% ethanol. The mixture was kept at room temperature for 1 hour, acidified with acetic acid and evaporated to dryness under reduced pressure. Chromatography of the residue on neutral alumina afforded 16β-methyl-$\Delta^{9(11)}$-allopregnene-3β,17α-diol-20-one.

The above compound was then treated as described in the case of 16α-methyl-$\Delta^{9(11)}$-allopregnene-3β,17α-diol-20-one (Example 1). By oxidation of its 3β-hydroxyl group with 8 N chromic acid, there was obtained 16β-methyl-$\Delta^{9(11)}$-allopregnen-17α-ol-3,20-dione; acetoxylation at C-21 gave the 21-acetate of 16β-methyl-$\Delta^{9(11)}$-allopregnene-17α,21-diol-3,20-dione; this compound was converted into the 21-acetate of 16β-methyl-$\Delta^{1,4,9(11)}$-pregnatriene-17α,21-diol-3,20-dione by dibromination at C-2 and C-4, followed by dehydrobromination; by the reported method of 11β-hydroxylation and fluorination at C-9α there was finally obtained the 21-acetate of 16β-methyl-9α-fluoroprednisolone.

EXAMPLE 4

In accordance with the method described in Example 1, 16α-methyl-$\Delta^{9(11)}$-allopregnene-3β,17α-diol-20-one prepared as described in the aforesaid example, was acetoxylated to form the 21-acetate of 16α-methyl-$\Delta^{9(11)}$-allopregnene-3β,17α,21-triol-20-one and this compound was then oxidized to the 21-acetate of 16α-methyl-$\Delta^{9(11)}$-allopregnene-17α,21-diol-3,20-dione, which was further processed as described in Example 1, to produce finally 16α-methyl-9α-fluoro-prednisolone 21-acetate.

EXAMPLE 5

In accordance with the procedure described in Example 1, 16α-methyl-$\Delta^{9(11)}$-allopregnen-17α-ol-3,20-dione, intermediate in the aforesaid example, was converted into 16α-methyl-9α-fluoro-allopregnane-11β,17α-diol-3,20-dione (via the 9α-bromo-11β-hydroxy compound and then the 9β-11β-oxido compound), then acetoxylated to produce the 21-acetate of 16α-methyl-9α-fluoro-allopregnane-11β,17α,21-triol-3,20-dione and finally there were introduced into this compound the double bonds at C-1, 2 and C-4, 5, thus producing the 21-acetate of 16α-methyl-9α-fluoro-$\Delta^{1,4}$-pregnadiene-11β,17α,21-triol-3,20-dione.

EXAMPLE 6

In accordance with the procedure described in Example 1, 16α-methyl-9α-fluoro-allopregnane-11β,17α-diol-3,20-dione, intermediate in the preceding example, was brominated at C-2 and C-4 and then dehydrobrominated with calcium carbonate in dimethylacetamide. The resulting 16α-methyl-9α-fluoro-$\Delta^{1,4}$-pregnadiene-11β,17α-diol-3,20-dione was acetoxylated at C-21, by the method described also in Example 1, to produce finally the 21-acetate of 16α-methyl-9α-fluoro-$\Delta^{1,4}$-pregnadiene-11β,17α-21-triol-3,20-dione.

EXAMPLE 7

In accordance with the procedure described in Example 1, 16α-methyl-$\Delta^{9(11)}$-allopregnen-17α-ol-3,20-dione intermediate in the aforesaid example, was converted by dibromination at C-2 and C-4, followed by dehydrobromination into 16α-methyl-$\Delta^{1,4,9(11)}$-pregnatrien-17α-ol-3,20-dione and the latter was acetoxylated at C-21 to form the intermediate 21-acetate of 16α-methyl-$\Delta^{1,4,9(11)}$-pregnatriene-17α,21-diol-3,20-dione, this compound was converted into 16α-methyl-9α-fluoro-prednisolone acetate by treatment with N-bromoacetamide, 9β,11β-oxide formation and opening of the epoxide with hydrogen fluoride, as described in Example 1.

EXAMPLE 8

By following the procedure of Example 4, 16β-methyl-$\Delta^{9(11)}$-allopregnene-3β,17α-diol-20-one; prepared as described in Example 3, was converted into the 21-acetate of 16β-methyl-$\Delta^{9(11)}$-allopregnene-3β,17α,21-triol-20-one and then oxidized to produce 21-acetate of 16β-methyl-$\Delta^{9(11)}$-allopregnene-17α,21-diol-3,20-dione, which was further processed as described in Example 3, to obtain 16β-methyl-9α-fluoro-prednisolone acetate.

EXAMPLE 9

By following the procedure of Example 5, but using 16β-methyl-$\Delta^{9(11)}$-allopregnen-17α-ol-3,20-dione as starting material, instead of the 16α-epimer, there were obtained, successively, 16β-methyl-9α-fluoro-allopregnane-11β,17α-diol-3,20-dione, 16β-methyl-9α-fluoro-allopregnane-11β,17α,21-triol-3,20-dione 21-acetate, and finally 16β-methyl-9α-fluoro-$\Delta^{1,4}$-pregnadiene-11β,17α,21-triol-3,20-dione 21-acetate identical with that obtained in Example 3.

EXAMPLE 10

In accordance with the method of Example 6, 16β-methyl-9α-fluoro-allopregnane-11β,17α-diol-3,20-dione, intermediate in the preceding example, was converted into the corresponding $\Delta^{1,4}$-bis-dehydro derivative and then acetoxylated at C–21, thus affording also 16β-methyl-9α-fluoro-prednisolone acetate.

EXAMPLE 11

In accordance with the procedure described in Example 1, 16β-methyl-Δ9(11)-allopregnen-17α-ol-3,20-dione, intermediate in Example 3, was brominated and dehydrobrominated thus producing 16β-methyl-Δ1,4,9(11)-pregnatrien-17α-ol-3,20-dione. Acetoxylation of the latter at C–21, by following the method described also in Example 1, gave the 21-acetate of 16β-methyl-Δ1,4,9(11)-pregnatriene-17α,21-diol-3,20-dione. Further treatment of the latter compound with N-bromoacetamide, 9β,11β-oxide formation and opening the epoxide with hydrogen fluoride in accordance with the method described in Example 1, gave the 21-acetate of 16β-methyl-9α-fluoro-prednisolone.

EXAMPLE 12

There was prepared a mixture of 3 g. of finely powdered 16α-methyl-Δ9(11) - allopregnen-3β,17α-diol-20-one prepared in accordance with Example 1, and 60 cc. of chloroform containing 1% of ethanol; this mixture was treated with dry hydrogen chloride for 15 minutes, then treated with a solution of 0.5 g. of bromine in 20 cc. of chloroform, in the course of 45 minutes, with stirring during the whole operation. The reaction mixture was stir-stirred for 5 minutes further and then diluted with 150 cc. of ether, stirred for 25 minutes in an ice bath and the solid was filtered; the filtrate was consecutively washed with water, 5% aqueous sodium carbonate solution and water, dried over anhydrous sodium sulfate and the solvent was evaporated under reduced pressure and at room temperature. The residue consisted of the crude 16α-methyl-21-bromo-Δ9(11)-allopregnene-3β,17α-diol-20-one.

The above product was refluxed with 150 cc. of acetone and 9 g. of potassium acetate for 5 hours under anhydrous conditions. After concentrating to a small volume, the mixture was diluted with water and the precipitate was collected, washed with water, dried and recrystallized from ethyl acetate, thus yielding the 21-acetate of 16α-methyl-Δ9(11)-allopregnene-3β,17α,21-triol-20-one, which was further oxidized at C–3 and then processed in accordance with the reported method of 11β-hydroxylation and fluorination at C–9α, thus giving the 21-acetate of 16α-methyl-9α-fluoro-11β-hydroxy allopregnane-17α,21-diol-3-one. Dibromination at C–2 and C–4, followed by dehydrobromination afforded 16α-methyl-9α-fluoro-prednisolone acetate.

EXAMPLE 13

A mixture of 5 g. of 16α-methyl-9α-fluoro-allopregnane-11β,17α-diol-3,20-dione prepared as described in Example 5, 100 cc. of tertiary amyl alcohol, 5 g. of recently sublimed selenium dioxide and a few drops of pyridine was refluxed under an atmosphere of nitrogn for 48 hours and then filtered through Celite. The solvent was evaporated under reduced pressure, the residue was decolorized with decolorizing charcoal in acetone solution, filtered and the acetone was evaporated; the residue was purified by chromatography on neutral alumina to produce 16α-methyl-9α-fluoro-Δ1,4-pregnadiene-11β,17α-diol-3,20-dione. The latter was acetoxylated at C–21 by monoiodination followed by acetolysis, as described for these operations in Example 1, and there was thus obtained 16α-methyl-9α-fluoro-prednisolone acetate.

EXAMPLE 14

By the method of the preceding example there were introduced the double bonds at C–1, 2 and C–4, 5 of the 21-acetate of 16α-methyl-9αfluoro-allopregnane-11β,17α,21-triol-3,20-dione, intermediate in Example 5, and there was also obtained 16α-methyl-9α-fluoro-prednisolone acetate.

We claim:
1. In the process for the production of 16-methyl-9α-fluoro prednisolone-21-acetate the steps comprising reacting a compound of the following formula:

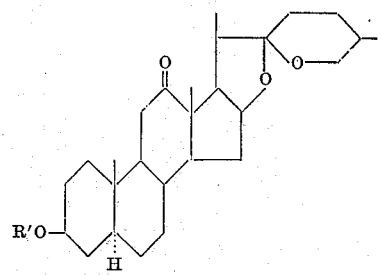

wherein R′ is selected from the group consisting of hydrogen and a hydrocarbon carboxylic acyl group of less than 12 carbon atoms with selenium dioxide in t-butanol and in the presence of catalytic amounts of pyridine to introduce a double bond between C–9 and C–11, reacting the resulting Δ9(11)-compound with hydrazine and an alkali metal hydroxide to remove the 12-keto group, degrading the side chain of the resulting reduction product with acetic anhydride, chromic acid and potassium hydroxide to introduce another double bond between C–16 and C–17 and form the acetyl chain at C–17.

2. 16α-methyl-Δ9(11)-allopregnen-3β-ol-20-one.
3. 16β-methyl - 16α,17α - oxido - Δ9(11) - allopregnen-3β-ol-20-one.
4. A compound of the formula

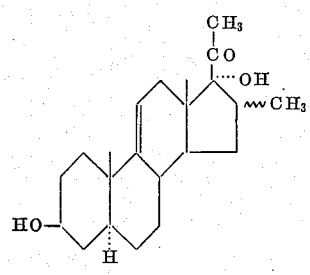

5. A compound of the formula

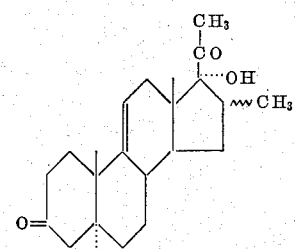

6. A compound of the formula

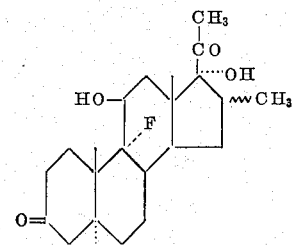

7. A compound of the formula

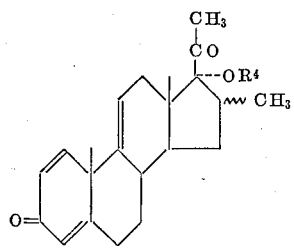

wherein $R^4$ is selected from the group consisting of hydrogen and the acyl radical of a hydrocarbon carboxylic acid having up to 12 carbon atoms.

8. 16α-methyl-$\Delta^{9(11)}$-allopregnene-3β,17α-diol-20-one.
9. 16α-methyl-$\Delta^{9(11)}$-allopregnen-17α-ol-3,20-dione.
10. 16β-methyl-$\Delta^{9(11)}$-allopregnene - 3β,17α - diol-20-one.
11. 16β-methyl-$\Delta^{9(11)}$-allopregnen-17α-ol-3,20-dione.
12. 16α-methyl - 9α - fluoro-allopregnane-11β,17α-diol-3,20-dione.
13. 16α - methyl - $\Delta^{1,4,9(11)}$ - pregnatrien-17α-ol-3,20-dione.

References Cited by the Examiner

UNITED STATES PATENTS

| 2,838,536 | 6/1958 | Magerlein et al. | 260—397.45 |
| 2,838,542 | 6/1958 | Spero et al. | 260—397.45 |
| 2,980,713 | 4/1961 | Chemerda et al. | 260—397.45 |

OTHER REFERENCES

Ehmann et al.: Helv. Chim. Acta., vol. 42 (1959), pp. 2548–2557.

Hirschmann et al.: J. Am. Chem. Soc., vol. 75 (1953), pp. 3252–3255.

Marker et al.: J. Am. Chem. Soc., vol. 69 (1947), pp. 2167–2230 (pp. 2170–72 relied on).

Oliveto et al.: J. Am. Chem. Soc., vol. 80 (1958), p. 4428.

LEWIS GOTTS, Primary Examiner.

LESLIE H. GASTON, MORRIS LIEBMAN, Examiners.

M. L. WILLIAMS, Assistant Examiner.